United States Patent
Maros et al.

(10) Patent No.: US 10,203,415 B2
(45) Date of Patent: Feb. 12, 2019

(54) METHODS FOR TOPOLOGY AND AUTOMATIC NEIGHBORHOOD DETECTION IN LIGHTING SYSTEM

(71) Applicant: GENERAL ELECTRIC COMPANY, Schenectady, NY (US)

(72) Inventors: István Maros, BudaPest (HU); Gábor Törös, BudaPest (HU); Roland Bátai, BudaPest (HU); Ténia Alexandra Kovács, BudaPest (HU); Tamás Both, BudaPest (HU); Tamás Varjasi, BudaPest (HU); Gábor Csaba Hencz, BudaPest (HU)

(73) Assignee: General Electric Company, Schenectady, NY (US)

(*) Notice: Subject to any disclaimer, the term of this patent is extended or adjusted under 35 U.S.C. 154(b) by 299 days.

(21) Appl. No.: 14/964,486

(22) Filed: Dec. 9, 2015

(65) Prior Publication Data

US 2017/0167864 A1    Jun. 15, 2017

(51) Int. Cl.
| | |
|---|---|
| G01B 21/16 | (2006.01) |
| G01S 19/13 | (2010.01) |
| H05B 37/02 | (2006.01) |
| G01S 19/14 | (2010.01) |
| G01S 19/42 | (2010.01) |
| G01S 5/02 | (2010.01) |

(52) U.S. Cl.
CPC ............... *G01S 19/13* (2013.01); *G01S 5/02* (2013.01); *G01S 5/0289* (2013.01); *G01S 19/14* (2013.01); *G01S 19/42* (2013.01); *H05B 37/0227* (2013.01); *H05B 37/0272* (2013.01); *H05B 37/0281* (2013.01)

(58) Field of Classification Search
CPC .......... G01S 19/13; G01S 19/14; G01S 19/42; G01S 5/02; G01S 5/0289; H05B 37/0227; H05B 37/0272; H05B 37/0281
USPC .......... 702/150; 315/70, 132, 152, 153, 154, 315/159, 160, 291, 294, 297, 307, 308
See application file for complete search history.

(56) References Cited

U.S. PATENT DOCUMENTS

| | | |
|---|---|---|
| 7,006,453 B1 | 2/2006 | Ahmed et al. |
| 7,697,458 B2 | 4/2010 | Park et al. |
| 7,952,522 B2 | 5/2011 | Hohl |
| 8,232,745 B2 | 7/2012 | Chemel et al. |
| 8,368,321 B2 | 2/2013 | Chemel et al. |

(Continued)

FOREIGN PATENT DOCUMENTS

ES    2389531 A1    10/2012

*Primary Examiner* — John H Le
(74) *Attorney, Agent, or Firm* — Peter T. DiMauro; GPO Global Patent Operation

(57) ABSTRACT

Apparatuses and methods, the methods including installing a plurality of lighting fixtures, each of the lighting fixtures being installed at a location where they are to be operated and including at least one of a motion sensor and a global positioning system (GPS) device; receiving a signal from the plurality of lighting fixtures; storing a dataset including data representing the signals from the plurality of lighting fixtures; determining a correlation between the plurality of lighting fixtures and/or determining neighboring lighting fixtures for the plurality of lighting fixtures; and determining a topology of the installed lighting fixtures based on the determined correlation between the plurality of lighting fixtures.

20 Claims, 16 Drawing Sheets

| 610 ↓ | | ID: 21 | ID: 22 | ID: 23 | ID: 24 | ID: 25 | ID: 26 | ID: 27 |
|---|---|---|---|---|---|---|---|---|
| | | 1 | 2 | 3 | 4 | 5 | 6 | 7 |
| ID: 21 | 1 | 1 | 0.4348 | 0.4348 | 0.3309 | 0.1709 | 0.0754 | 0.1019 |
| ID: 22 | 2 | 0.4348 | 1 | 0.5693 | 0.2132 | 0.1085 | 0.0419 | 0.0610 |
| ID: 23 | 3 | 0.4348 | 0.5693 | 1 | 0.2132 | 0.1085 | 0.0419 | 0.0610 |
| ID: 24 | 4 | 0.3309 | 0.2132 | 0.2132 | 1 | 0.7816 | 0.3198 | 0.2043 |
| ID: 25 | 5 | 0.1709 | 0.1085 | 0.1085 | 0.7816 | 1 | 0.3354 | 0.2145 |
| ID: 26 | 6 | 0.0754 | 0.0419 | 0.0419 | 0.3198 | 0.3354 | 1 | 0.5184 |
| ID: 27 | 7 | 0.1019 | 0.0610 | 0.0610 | 0.2043 | 0.2145 | 0.5184 | 1 |

(56) References Cited

U.S. PATENT DOCUMENTS

| | | |
|---|---|---|
| 8,373,362 B2 | 2/2013 | Chemel et al. |
| 8,536,802 B2 * | 9/2013 | Chemel ................ H05B 37/029 |
| | | 315/291 |
| 8,552,664 B2 * | 10/2013 | Chemel .............. H05B 37/0245 |
| | | 315/291 |
| 2015/0035440 A1 | 2/2015 | Spero |

* cited by examiner

300

| | | |
|---|---|---|
| 42 | 2014-09-27 | 21:31:24 , 024 |
| 43 | 2014-09-27 | 21:31:25 , 045 |
| 44 | 2014-09-27 | 21:31:26 , 045 |
| 45 | 2014-09-27 | 21:31:27 , 045 |
| 46 | 2014-09-27 | 21:31:28 , 045 |
| 47 | 2014-09-27 | 21:31:29 , 045 |
| 48 | 2014-09-27 | 21:31:31 , 044 |
| 49 | 2014-09-27 | 21:31:32 , 044 |
| 50 | 2014-09-27 | 23:45:45 , 023 |
| 51 | 2014-09-27 | 23:46:13 , 022 |
| 52 | 2014-09-27 | 23:46:14 , 022 |
| 53 | 2014-09-27 | 23:46:47 , 021 |
| 54 | 2014-09-27 | 23:46:53 , 021 |
| 55 | 2014-09-27 | 23:46:54 , 021 |
| 56 | 2014-09-27 | 23:46:55 , 021 |
| 57 | 2014-09-28 | 00:06:26 , 045 |
| 58 | 2014-09-28 | 00:06:27 , 045 |
| 59 | 2014-09-28 | 00:29:03 , 010 |
| 60 | 2014-09-28 | 02:24:16 , 024 |

305 → row 46
310 → rows 49–51 (last column)
315 → rows 53–56
320 → rows 58–60

FIG. 3

|       | 1 | 2 | 3 | 4 | 5 | 6 | 7 |
|-------|---|---|---|---|---|---|---|
|       | ID: 21 | ID: 22 | ID: 23 | ID: 24 | ID: 25 | ID: 26 | ID: 27 |
| 1 | 1 | 0.4348 | 0.4348 | 0.3309 | 0.1709 | 0.0754 | 0.1019 |
| 2 | 0.4348 | 1 | 0.5693 | 0.2132 | 0.1085 | 0.0419 | 0.0610 |
| 3 | 0.4348 | 0.5693 | 1 | 0.2132 | 0.1085 | 0.0419 | 0.0610 |
| 4 | 0.3309 | 0.2132 | 0.2132 | 1 | 0.7816 | 0.3198 | 0.2043 |
| 5 | 0.1709 | 0.1085 | 0.1085 | 0.7816 | 1 | 0.3354 | 0.2145 |
| 6 | 0.0754 | 0.0419 | 0.0419 | 0.3198 | 0.3354 | 1 | 0.5184 |
| 7 | 0.1019 | 0.0610 | 0.0610 | 0.2043 | 0.2145 | 0.5184 | 1 |

| 28 | 0,570543 | 67 | 0,367852 |
|----|----------|----|----------|
| 26 | 0,328474 | 27 | 0,199532 |
| 30 | 0,328179 | 68 | 0,167443 |
| 29 | 0,298585 | 28 | 0,165475 |
| 31 | 0,252553 | 66 | 0,165338 |
| 65 | 0,243066 | 26 | 0,131285 |
| 48 | 0,229991 | 30 | 0,126896 |
| 46 | 0,228305 | 29 | 0,115004 |

| #6 | DISTANCE | ID |
|---|---|---|
| 1. | 2,5 m | #1 |
| 2. | 2,1 m | #2 |
| 3. | 1,4 m | #3 |
| 4. | 1 m | #4 |
| 5. | 1,2 m | #5 |
| 6. | 0 m | #6 |
| 7. | 1,3 m | #7 |
| 8. | 1,7 m | #8 |

FIG. 12

| #6 | DISTANCE | ID |
|---|---|---|
| 1. | 0 m | #6 |
| 2. | 1 m | #4 |
| 3. | 1,2 m | #5 |
| 4. | 1,3 m | #7 |
| 5. | 1,4 m | #3 |
| 6. | 1,7 m | #8 |
| 7. | 2,1 m | #2 |
| 8. | 2,5 m | #1 |

FIG. 13

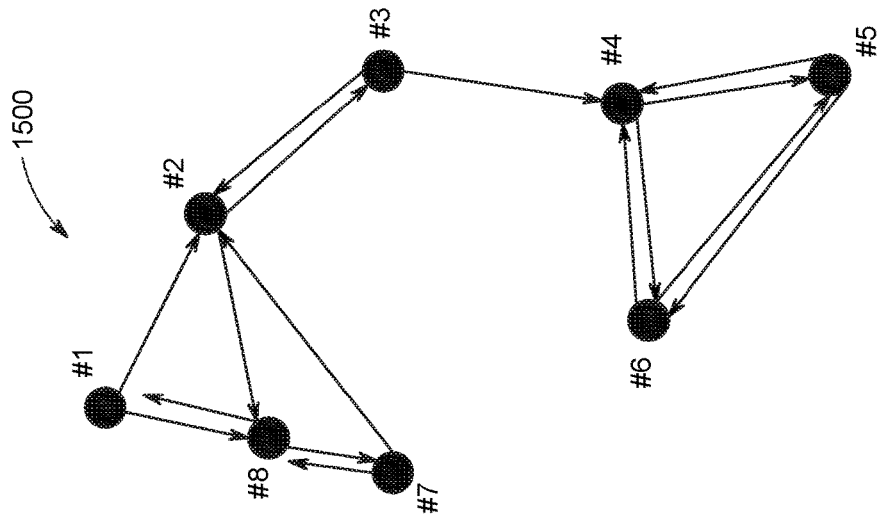

METHODS FOR TOPOLOGY AND AUTOMATIC NEIGHBORHOOD DETECTION IN LIGHTING SYSTEM

BACKGROUND

A number of different so-called intelligent lighting systems have previously been proposed. However, a significant problem with some of the prior intelligent lighting systems is a need to install the lighting fixtures therein at known locations or at least know the location of the installed lighting fixtures based on their pre-assigned identifiers. Additionally, an initial configuration and set-up or commissioning of some of the prior systems included a lengthy time-consuming and complex process(es).

Therefore, it would be desirable to efficiently provide improved methods and apparatus for providing lighting system location determinations for a variety of different applications.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein:

FIG. 3 is an illustrative depiction of a dataset, in accordance with some embodiments herein;

FIG. 6 is an illustrative depiction of an example matrix for a process, in accordance with some embodiments herein;

FIG. 8 is an illustrative tabular listing of data for a process, according to some embodiments herein;

FIG. 12 is an illustrative tabular listing of data for a process, in accordance with some embodiments herein;

FIG. 13 is an illustrative tabular listing of data for a process, in accordance with some embodiments herein; and FIG. 14 is an illustrative depiction of an example matrix for a process, in accordance with some aspects and embodiments herein;

FIG. 15 is an illustrative depiction of a lighting fixture installation, in accordance with some aspects and embodiments herein;

DETAILED DESCRIPTION

Figure 1:
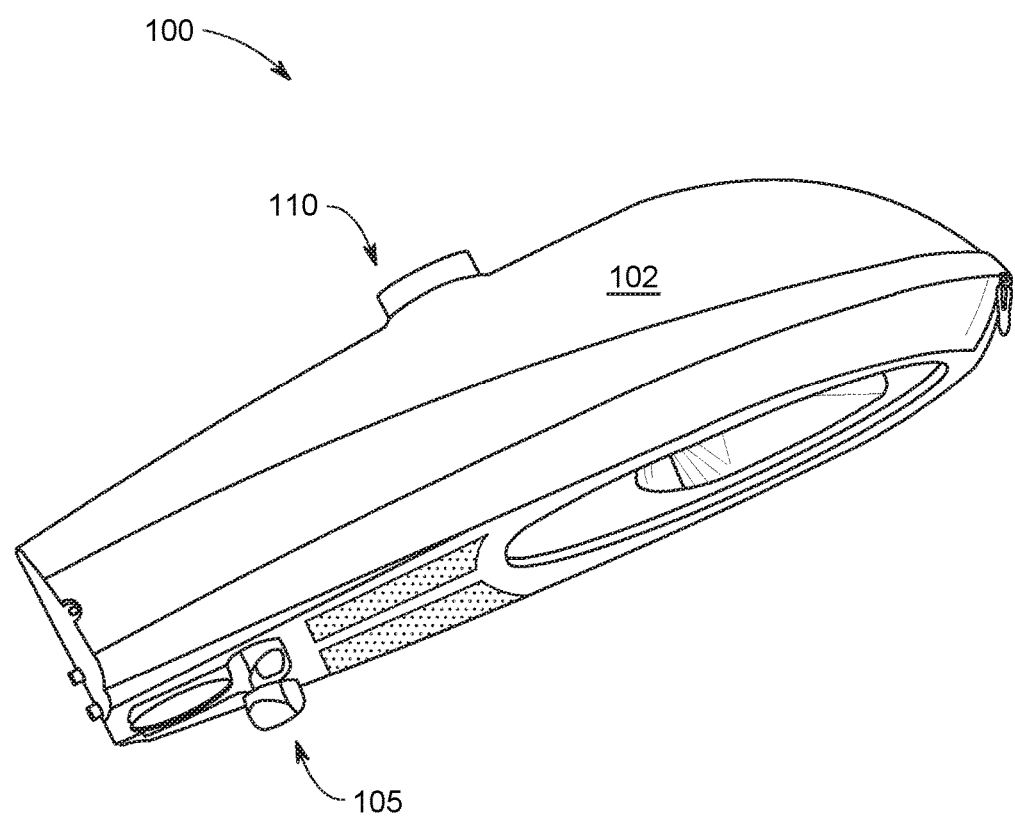
FIG. 1 is an illustrative depiction of a lighting fixture including sensors, in accordance with some aspects herein.

FIG. 1 is an illustrative depiction of a lighting fixture 100, in accordance with some embodiments herein. A lighting fixture herein may have an appearance different from the example lighting fixture shown in FIG. 1. In some embodiments, lighting fixture 100 may be designed and installed in an indoor or outdoor location. In some embodiments, the configuration and functionality of lighting fixture 100 may be designed for a particular application or use for which the lighting fixture will be used. Lighting fixture 100 includes a housing 102 to which a global positioning system (GPS) sensor/device and a motion sensor 105 are attached. In some embodiments, a lighting fixture herein may include one or both of sensors 105 and 110, either alone, in combination with each other, or in combination with other types of sensors (not shown). In some aspects, processes herein may depend on a lighting fixture having one or both of sensors 105 and 110.

In some aspects, motion sensor 105 is operatively functional to sense a motion in a vicinity of lighting fixture 100. The parameters defining the operational specifications of motion sensor 105 (e.g., detecting range, detecting angle(s), power, etc.) may vary without any loss of generality herein. Motion sensor 105 may further operate to generate a signal that can include data or information indicative of whether the motion sensor is or has detected a motion in the vicinity of the lighting fixture to which the motion sensor is attached to, located in, or otherwise associated with. The signal may be generated in response to the motion sensor detecting motion in the vicinity of the lighting fixture.

In some aspects, GPS sensor, device, or receiver 110 is operatively functional to receive GPS information from a plurality of satellites (not shown) and generate a signal including positioning or location data indicative of a location of GPS sensor 110 and thus, a location of lighting fixture 100 to which the GPS device is attached. Parameters defining the operational specifications of GPS sensor 110 (e.g., location accuracy, etc.) may vary without any loss of generality herein. GPS sensor 105 may further operate to transmit the signal that includes data or information indicative of the location of the lighting fixture to which it is attached to, located in, or otherwise associated with. In some embodiments, a location determining and reporting system other than a "GPS" system may be used.

As an overview, a process for realizing some of the systems and methods herein may include the manufacture of luminaires that may include a motion sensor, a GPS receiver device, and a processing or computation unit, wherein the manufactured luminaire has a unique identifier number assigned thereto during the manufacture of the unit. Each luminaire may be manufactured without any data or knowledge regarding any neighboring luminaires of a future installation site. Upon deployment of luminaires at an installation site, the luminaires are powered on for a first time, and they each start gathering data regarding a neighborhood graph (i.e., their surroundings with respect to other luminaires having appropriate signaling components). In particular, each luminaire generally starts receiving signals from GPS satellites via their GPS receivers to determine their own physical position. When their position is known (e.g., about 5-30 minutes after being powered on), the individual luminaires may execute a neighborhood detection algorithm or determination process using position data (for example, as explained in greater detail below, including FIG. 10). An outcome of the neighborhood detection algorithm or determination process can include a preliminary neighborhood graph that may have some limitations but still be sufficiently accurate for at least some adaptive light control operation(s). In some embodiments, the preliminary neighborhood graph may be limited since while some luminaires may be located physically close to each other, that state might not necessarily mean they are logically neighbors and vice versa. In general, the luminaires can independently start collecting motion data while operating (e.g., from being powered on). After a length of time appropriate to gather sufficient data for the installation (e.g., a reasonable amount of data may be collected over 1-20 days of operation, depending on a traffic flow and/or other considerations), the luminaires may execute a neighborhood detection algorithm or determination process based on the motion data collected by the luminaires (as will be explained in greater detail below, including FIG. 2). Based on the neighborhood detection algorithm or determination process that uses the motion data collected by the luminaires, the existing preliminary neighborhood graph may be modified to further refine, determine, or calculate a more accurate or final neighborhood graph. In some embodiments, the neighborhood detection algorithm or determination process (e.g., FIG. 2) may periodically be re-executed to verify the accuracy of the neighborhood graph and/or discover and correct errors therein, if any.

Figure 2:
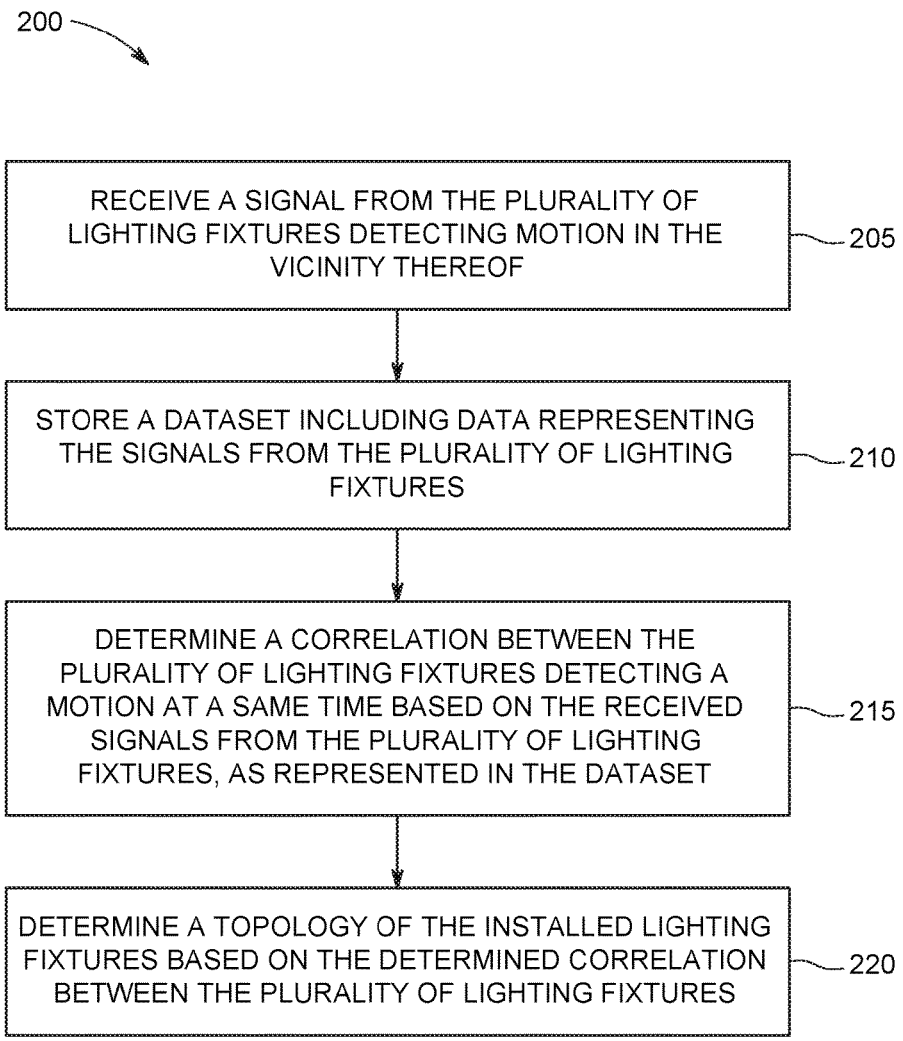
FIG. 2 is a flow diagram of a process, in accordance with some aspects herein.

FIG. 2 is a flow diagram of a process 200, in accordance with some embodiments herein. Operation 205 includes installing a plurality of lighting fixtures at a location where they are to be operated. In some aspects, process 200 relates to a method for determining a topology of a deployed system including a plurality of lighting fixtures. Accordingly, the lighting fixtures should be installed at their intended operational locations as an initial operation of process 200. The plurality of lighting fixtures deployed or installed in or before operation 205 should include at least a motion sensor, although the lighting fixture may have additional types of sensors. In particular, the installed lighting fixtures should have at least one a motion sensor disposed in or on the lighting fixture to sense a motion in a vicinity of the lighting fixture and to generate a signal in response to a detected motion by the motion sensor. In some aspects, the signal generated by the motion sensor should include, at least, an identifier of the lighting fixture. In some embodiments, the identifier for each lighting fixture can be assigned to the lighting fixture during a construction or configuration of the lighting fixture prior to operation 205.

At operation 210, a dataset including data representing the signals received from the plurality of lighting fixtures are stored in a storage facility, device, or mechanism. In some embodiments, the data may be stored in a memory of a computing device, including but not limited to a computer, a server, or a "cloud-based" storage facility. The storage facility may be part of a computer, server, or database management system that may be centralized or distributed and arranged in accordance with one or more data organizing schemas without limit herein. Operation 205 may include receiving motion data from all of the installed lighting fixtures before proceeding to other operations of process 200. In some embodiments, a sufficient amount of data relating to all of the installed lighting fixtures can be received and stored during operation 210 before process 200 advances to operation 215. In some use-cases, the data relating to all of the installed lighting fixtures may typically be collected over a period time that may include a few minutes, a few hours, a number of days, and a plurality of weeks. In some aspects, the time period can correspond to the time sufficient to gather motion data that is representative of the motion that will be experienced in the vicinity of the installed lighting fixtures.

FIG. 3 includes an illustrative depiction of a dataset 300, in accordance with some aspects herein. Dataset 300 includes a listing motion data for a plurality of installed lighting fixtures. For example, row 46 includes a timestamp 305 indicating when lighting fixture "045" detected a motion in the vicinity of that lighting fixture. The particular lighting fixture corresponding to a timestamp is shown in column 310. At 315, it is seen that a motion was repeatedly detected by lighting fixture "021" in relatively quick succession. The motion data referenced at 320 shows motion was detected at multiple different lighting fixtures (e.g., "04", "010", and "024").

At operation 215, a correlation between the plurality of installed lighting fixtures detecting a motion at a same time based on the received signals from the plurality of lighting fixtures, as represented in the dataset, is determined. In some embodiments, determining the correlation between the plurality of lighting sources includes processing the motion data received and stored at operation 210.

Figure 4:
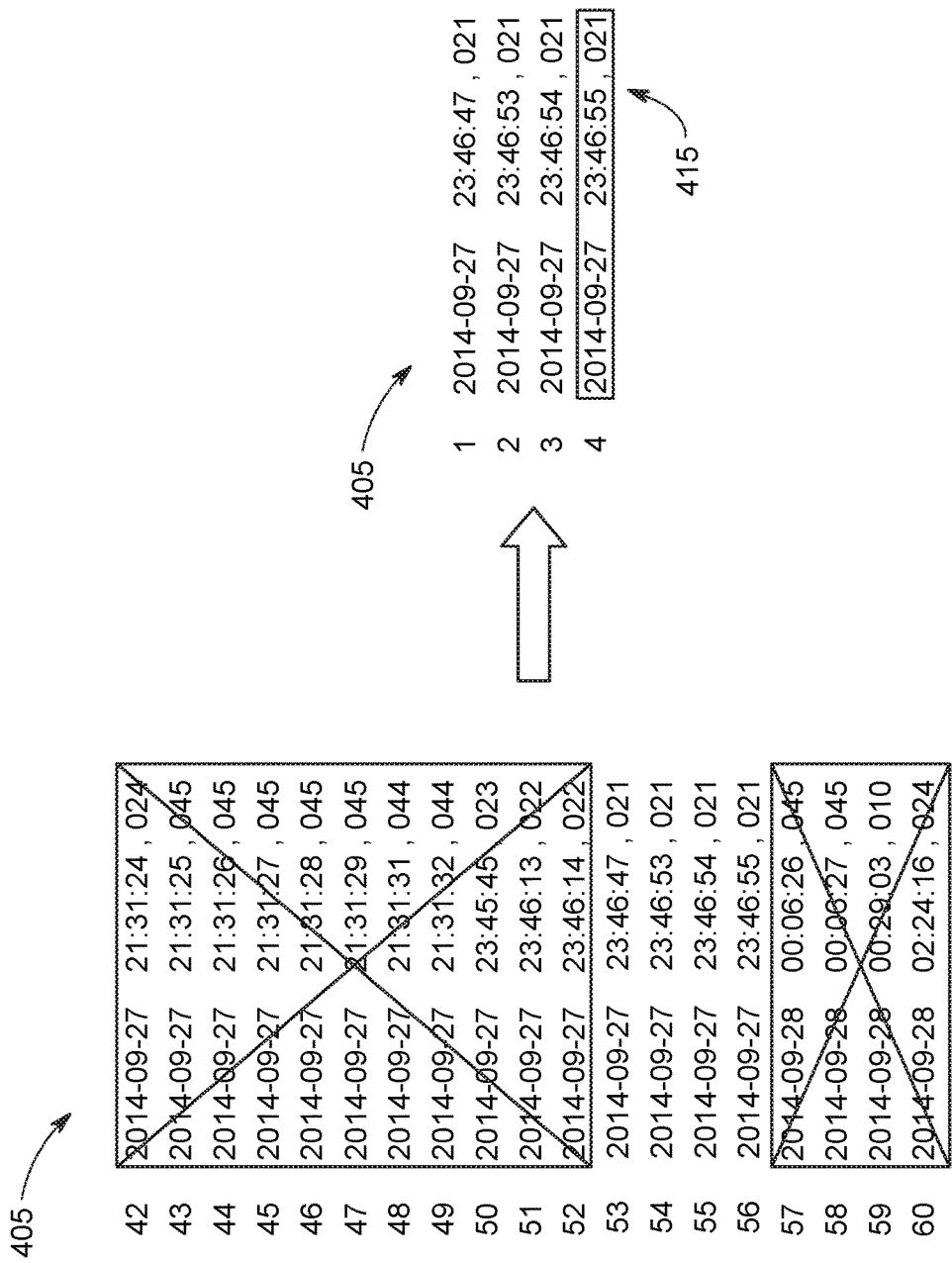
FIG. 4 is an illustrative depiction of an example dataset for a process, in accordance with some embodiments herein

FIG. 4 is an illustrative depiction of some aspects of a data processing flow to determine a correlation between a plurality of lighting fixtures based on a motion detected by the plurality of lighting fixtures. FIG. 4 illustrates an operation of isolating or obtaining motion data 410 for a specific lighting fixture such as, for example the lighting fixture having the assigned unique identifier of "021" in the installation of the present example, from a dataset including motion data related to all of the plurality lighting fixtures in the installation. As shown, all of the motion data 410 isolated from dataset 405 relates to lighting fixture "021", as indicated by the values in column 415.

Figure 5:
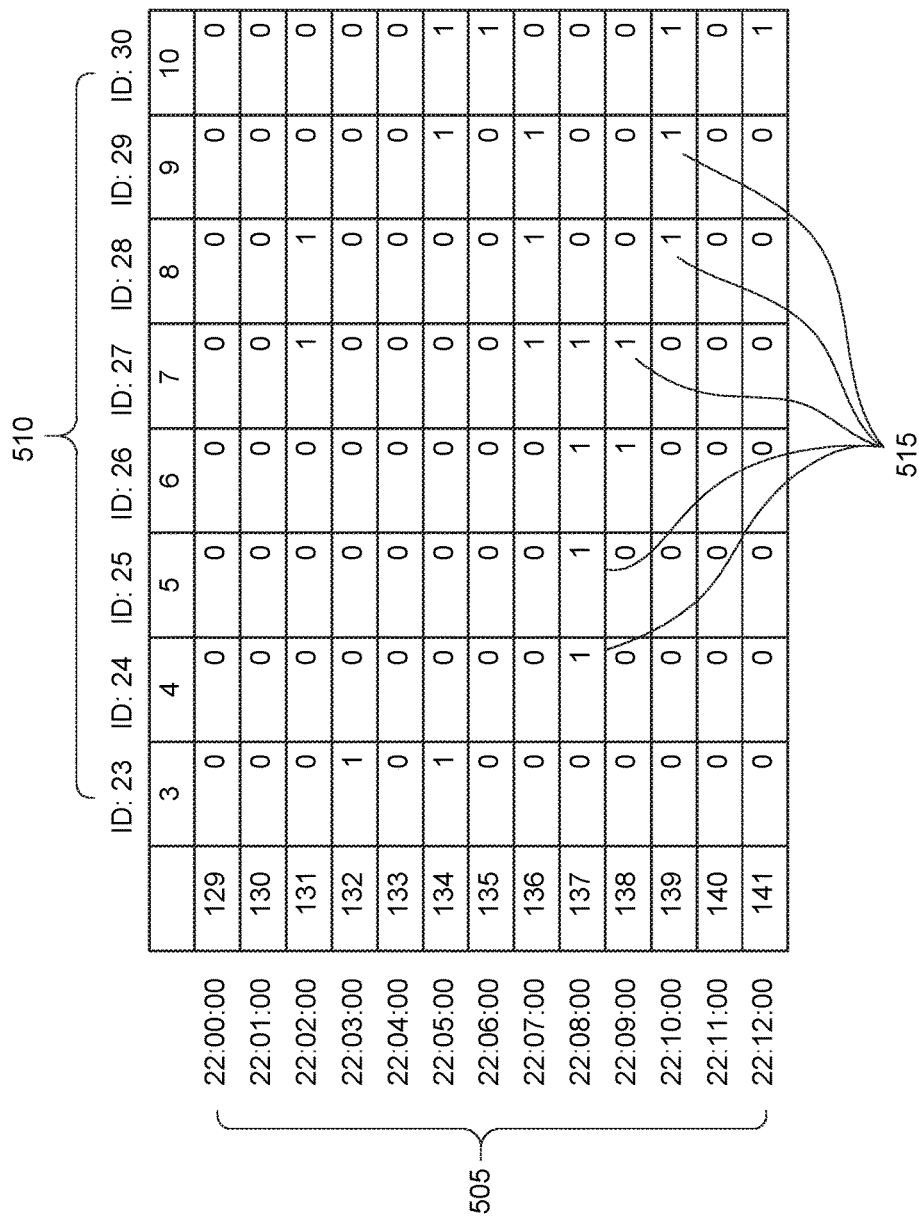
FIG. 5 is an illustrative depiction of an example matrix for a process, according to some embodiments herein.

In some embodiments, the determination of the correlation includes determining a matrix, "T", 500, as illustrated by the example of FIG. 5. Matrix 500 lists time intervals along axis (i) shown at 505 and lighting fixture identifiers for the lighting fixtures in the installed configuration of the present example along axis (j), as shown at 510. The time intervals (i) in the example of FIG. 5 are one minute each, although other time intervals may be used in some other embodiments herein. The length of a time interval (i) in a particular embodiment may be determined or set based on one or more considerations related to a specific use-case, including but not limited to, the location of the lighting fixtures' installation, the type of traffic that will frequent the area of the lighting fixtures (e.g., foot traffic, vehicle traffic, etc.), the expected frequency of motion in the vicinity of the installed lighting fixtures, etc. In some embodiments, the time interval (i) may be predetermined by a lighting system engineer, administrator, and other personnel or entity (e.g., a computing machine, a cloud-based service, an "app", etc.). In some embodiments, the time interval (i) may be dynamically determined based on an analysis of the data of gathered regarding motion for the plurality of lighting fixtures (e.g., FIG. 3, data 300). Referring to matrix T shown at 500 in FIG. 5, a "1" is listed to indicate a motion was detected by a particular ($j^{th}$) lighting fixture in the ($i^{th}$) time interval. Otherwise, matrix T lists a "0" to indicate that no motion was detected by the ($j^{th}$) lighting fixture in the ($i^{th}$) time interval. The following equation captures the relationship(s) described by matrix T.

$$T(i, j) = \begin{cases} 1, & \text{motion at } j^{th} \text{ lamp in the } i^{th} \text{ time interval} \\ 0, & \text{otherwise} \end{cases}$$

FIG. 6 is an illustrative depiction of a matrix, "R", 600, in accordance with a process of some embodiments herein. Matrix 600 includes a listing of correlation coefficients calculated from an input matrix T, such as the example matrix 500 of FIG. 5. Matrix 600 includes correlation coefficients R(i,j), where the value for the correlation coefficient indicates a strength of the correlation of motion detection between a first lighting fixture (i.e., a $i^{th}$ lamp) shown on axis 610 and a second lighting fixture (i.e., a $j^{th}$ lamp) listed along axis 615. A stronger correlation corresponds to higher value for the correlation coefficient. The correlation coefficients of the present embodiment have a value of 0≤R≤1. In some embodiments, the correlation and the correlation coefficients herein may be calculated by using the following equations.

$$cov(i,j)=E[(T_i-E[T_i])(T_j-E[T_j])]$$

where $T_i$ is a column vector; and $$R(i, j) = \frac{cov(i, j)}{\sqrt{cov(i, j)cov(i, j)}}.$$

As shown in matrix 600, the correlation coefficient is 1 for each lighting fixture and itself, as one would expect. The correlation for each lighting fixture or lamp and other lamps is some value less than one and greater than zero. The stronger the calculated correlation, the stronger the likelihood that two lamps will detect the same motion at the same time.

Figure 7:
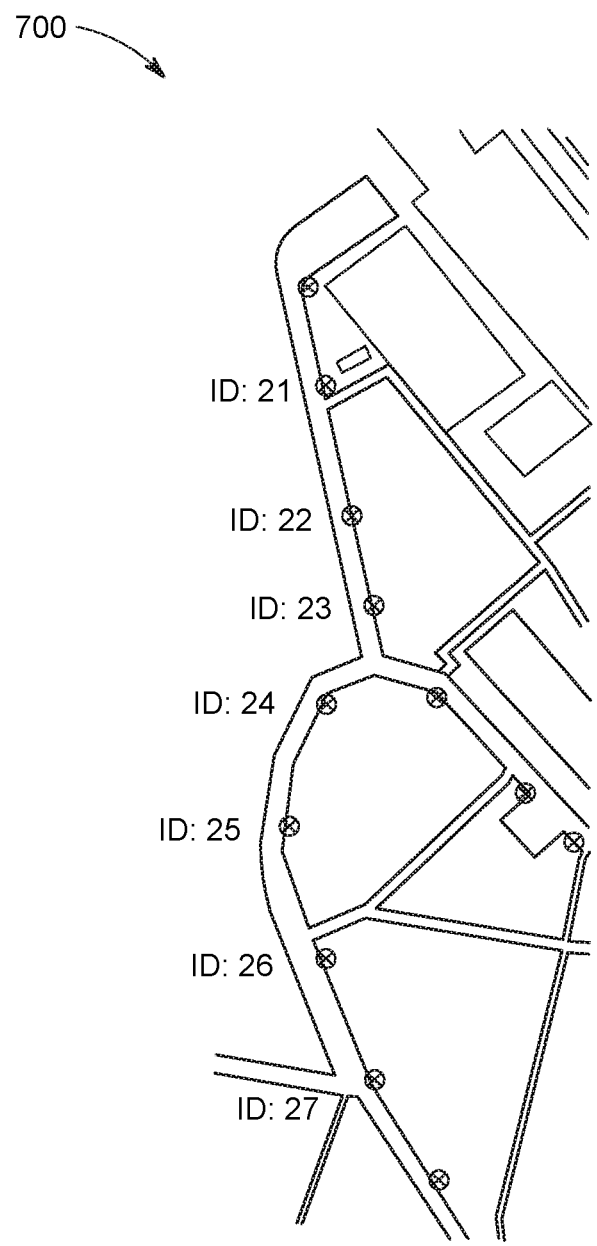
FIG. 7 is an illustrative depiction of a lighting fixture installation corresponding to FIG. 6, according to some embodiments herein.

FIG. 7 is an illustrative depiction of an installation of a plurality of lighting fixtures that corresponds to the example correlation matrix of FIG. 6. A review of matrix 600 in combination with the system depicted in FIG. 7 shows that closest neighboring lighting fixtures have the higher correlation coefficients. The correlation matrix however provides an insight into how strong (or weak) the correlation between neighboring lighting fixtures is based on actual motion data generated by the installed lighting fixtures.

Returning to the process of FIG. 2 and proceeding to operation 220, a topology of the installation of the plurality of lighting fixtures may be determined based on the calculated correlation matrix herein. For example, the identifiers for each of the lighting fixtures may be accurately associated with the appropriate lamp.

FIG. 8 is an illustrative depiction of a technique that may be used to determine neighbors based on the correlation data of some embodiments herein. In particular, the correlation coefficients of matrix R are listed in ascending order for a lighting fixture. FIG. 8 shows an illustrative depiction of an ordered listing of correlation data for a lighting fixture having lamp ID "27" at 805 and a lighting fixture having lamp ID "65" at 810. Based on the ordered listing of the correlation data, a determination of the corresponding neighbors for a particular lighting fixture can be determined. In the present example, lamps corresponding to the two largest R values are considered to be neighbors of a lighting fixture. For example, for lighting fixture "27", its neighbors are lighting fixtures "28" and "26" since these lamps have the highest corresponding R values as calculated with respect to lamp "27". Likewise for lighting fixture "65", its neighbors are lighting fixtures "67" and "27" since these lamps have the highest corresponding R values as calculated with respect to lamp "65".

Figure 9:
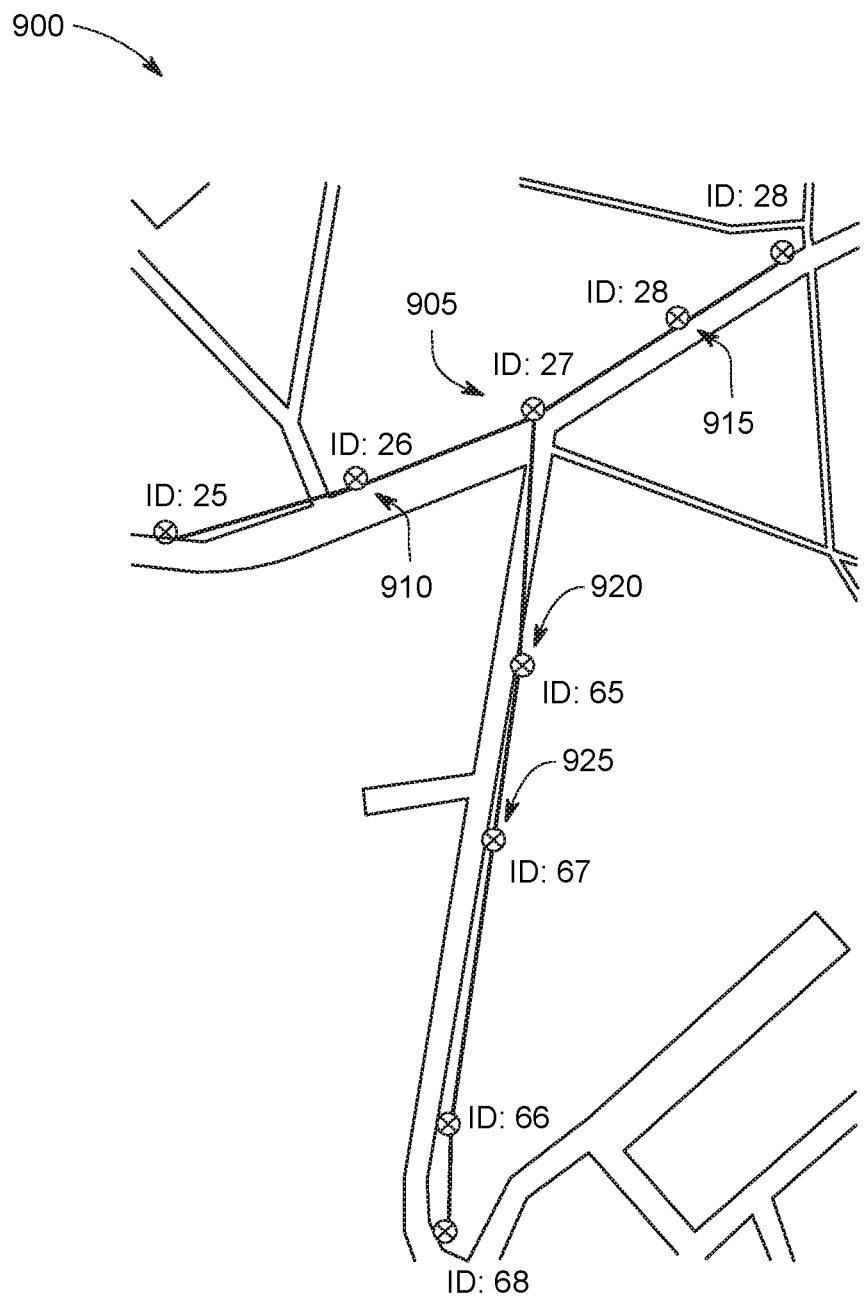
FIG. 9 is an illustrative depiction of a lighting fixture installation corresponding to FIG. 8, according to some embodiments herein.

FIG. 9 is an illustrative depiction of a system including an installation of a plurality of lighting fixtures where the topology of the system can be determined based on motion data received from the plurality of lighting fixtures, in accordance with some embodiments herein. As shown, lamp "27" at 905 has neighbors of lamp "26" at 910 and lamp "28" at 915" and lamp "65" at 920 has as its neighbors lamp "67" at 925 and lamp "27" at 905. In some aspects, some embodiments herein may gather, collect, or otherwise obtain motion data for all lighting fixtures of a subject installation, determine a correlation between the lighting fixtures, and make further determinations regarding the topology and/or other aspects of the lighting fixtures. In one aspect, an accurate determination of the lighting fixture's identifier can be determined based on the correlation data derived from the motion data associated with the lighting fixtures.

In this manner, the installation of the lighting fixtures may be eased by obviating a need to install lamps with a given identifier in a specific location. Furthermore, lighting control schemes for the plurality of lighting fixtures may be intelligently and accurately designed and implemented based on the knowledge and insights captured by the motion data (e.g., correlation matrix) of some embodiments herein.

Referring again to FIG. 1, it is noted that lighting fixture 100 may be designed and installed in an outdoor location. Again, lighting fixture 100 includes a housing 102 to which a global positioning system (GPS) sensor 110 is attached.

In some aspects, GPS device 110 is operatively functional to receive GPS information from a plurality of satellites (not shown) and generate a signal including positioning or location data indicative of a location of GPS sensor 110 and thus, a location of lighting fixture 100 to which the GPS sensor is attached. Parameters defining the operational specifications of GPS device 110 (e.g., location accuracy, etc.) may vary without any loss of generality herein. GPS device 105 may further operate to transmit the signal that includes data or information indicative of the location of the lighting fixture to which the location sensor is attached to, located in, or otherwise associated with.

Figure 10:
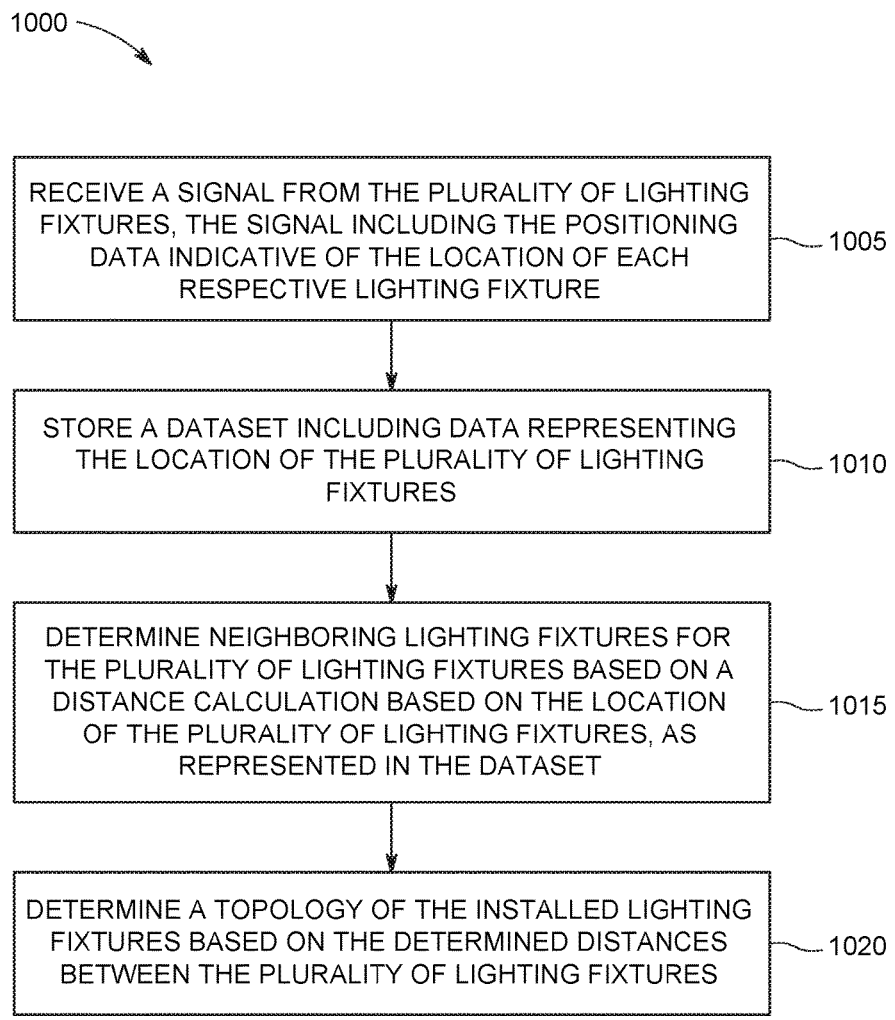
FIG. 10 is an illustrative flow diagram of a process, in accordance with some embodiments herein.

FIG. 10 is a flow diagram of a process 1000, in accordance with some embodiments herein. Operation 1005 includes installing a plurality of lighting fixtures at a location where they are to be operated. In some aspects, process 1000 relates to a method for determining a topology of a deployed system including a plurality of lighting fixtures. Accordingly, the lighting fixtures should be installed at their intended operational locations as an initial or pre-step to operation of process 1000. The plurality of lighting fixtures deployed or installed in prior to or as part of operation 1005 should include at least a GPS device, although the lighting fixture may have additional types of sensors. In particular, the installed lighting fixtures should have at least one a GPS device or other location determining device, system, or mechanism (e.g., a system using one or more types of RF signals other than Global Positioning System signals) disposed in or on the lighting fixture to receive location data or positioning data of the lighting fixture and to generate a signal including data indicative of the location of the lighting fixture. In some aspects, the signal generated by the GPS device should include, at least, an identifier of the lighting fixture. In some embodiments, the identifier for each lighting fixture can be assigned to the lighting fixture during a construction or configuration of the lighting fixture prior to operation 1005.

At operation 1010, a set of data including information representing the signals including positioning data and received from the plurality of lighting fixtures are stored in a storage facility, device, or mechanism. In some embodiments, the data may be stored in a memory of a computing device, including but not limited to a computer, a server, or a "cloud-based" storage system. The storage facility may be part of or connected to a computer, server, or database management system that may be centralized or distributed and arranged in accordance with one or more data organizing schemas without limit herein.

In some embodiments, operation 1005 may include receiving positioning or location data from all of the installed lighting fixtures before proceeding to other operations of process 1000. In some embodiments, an amount of data relating to all of the installed lighting fixtures can be received during operation 1005 before process 1000 advances to other operations of process 1000. In some use-cases, location or positioning data relating to all of the installed lighting fixtures may typically be received at operation 1005 and collected at operation 1010 from the lighting fixtures shortly after each lighting fixture is energized. In some embodiments, the GPS device in each lighting fixture determines in a first instance its location in response to being powered on and, for example, signals received from one or more GPS satellites. In some embodiments, the operations of process 1000 may be performed automatically when a lighting system configuration of multiple lighting fixtures is installed. The initial set-up and determining of the positions, absolute and/or relative to each other, may be referred to as a commissioning of the system. In some embodiments, the calculation or derivation of the location data of the lighting fixtures may be periodically updated by the GPS devices, particularly when changes occur to the installation positions of lighting devices in a subject lighting fixture system.

In some embodiments, detection of the locations of the lighting fixtures may be accomplished by configuring lighting fixtures in a "master-slave" configuration. In the instance the system is configured to have a monitoring centralized computer, server, or service, one of the lighting fixtures (i.e., nodes) is designated a "master" and the others are "slave" nodes that will communicate their location data to the master node. The "master" node may act as a "gateway" connected to the centralized computer, server, or service. The "master" operates to send the location data to the centralized computer, server, or service. In some embodiments, there is no central computer or server or service and one of the lighting fixtures may be (randomly) designated the "master". In some embodiments, the master may transmit a "ping" request or other signal via a uniform communication network. In some configurations, the network is a mesh network and some of the nodes thereof may repeat the request in an effort to transmit the "ping" request to all of the nodes of the lighting fixtures. In response to the "ping" request(s), each light fixture node transmits its answer that includes its communication address and GPS/location data to the "master" node. In some embodiments, the transmission of the answer in reply to the "ping" request(s) is sent after a randomly chosen time delay in a maximized time window as a method of avoiding collisions of the answer messages on the network. In some embodiments, the "master" may acknowledge its receipt of the answer message including the communication address and GPS/location data to the "master" node.

After receiving the communication address and GPS/location data from the various other lighting fixtures, a "master" node may commence with operation 1015 of process 1000. At operation 1015, a determination of neighboring light fixtures for the plurality of lighting fixtures in a subject installation can be executed. In some embodiments herein, a distance calculation based on or derived from the location data (e.g., GPS data) from each of the lighting fixtures and indicative of their location is used to determine a lighting fixtures neighbors. As used herein, a "neighbor" of a light fixture is a next closest light fixture as measured by a distance between the light fixtures.

In some embodiments, the positioning, location, GPS data received at operation 1005, stored at operation 1010 and used in operation 1015 may include or refer to a longitudinal value and a latitudinal value representing the location of each lighting fixture. These values may be transferred to global reference system such as, for example, a three-dimensional Descartes coordinate system. In some embodiments, the calculation of locations in the 3-D coordinate system based on the longitudinal and latitudinal values representing the location of each lighting fixture may be determined using the following equations.

$$x = R * \cos \varphi * \cos \lambda$$

$$y = R * \sin \varphi * \sin \lambda$$

$$z = R * \sin \lambda$$

Where $\varphi$=longitude (radian), $\lambda$=latitude (radian), and R (radius of the Earth)~6,3781,137 km.

Using the location for each of the lighting fixtures as determined above in some embodiments, the distance between the lighting fixtures may be calculated using the following relationships.

$$dh = \sqrt{(x_2 - x_1)^2 + (y_2 - y_1)^2 + (z_2 - z_1)^2}$$

$$\alpha = 2 * \sin^{-1}\left(\frac{dh}{2 * R}\right)$$

$$\text{Distance} = R * \alpha$$

Figure 11:
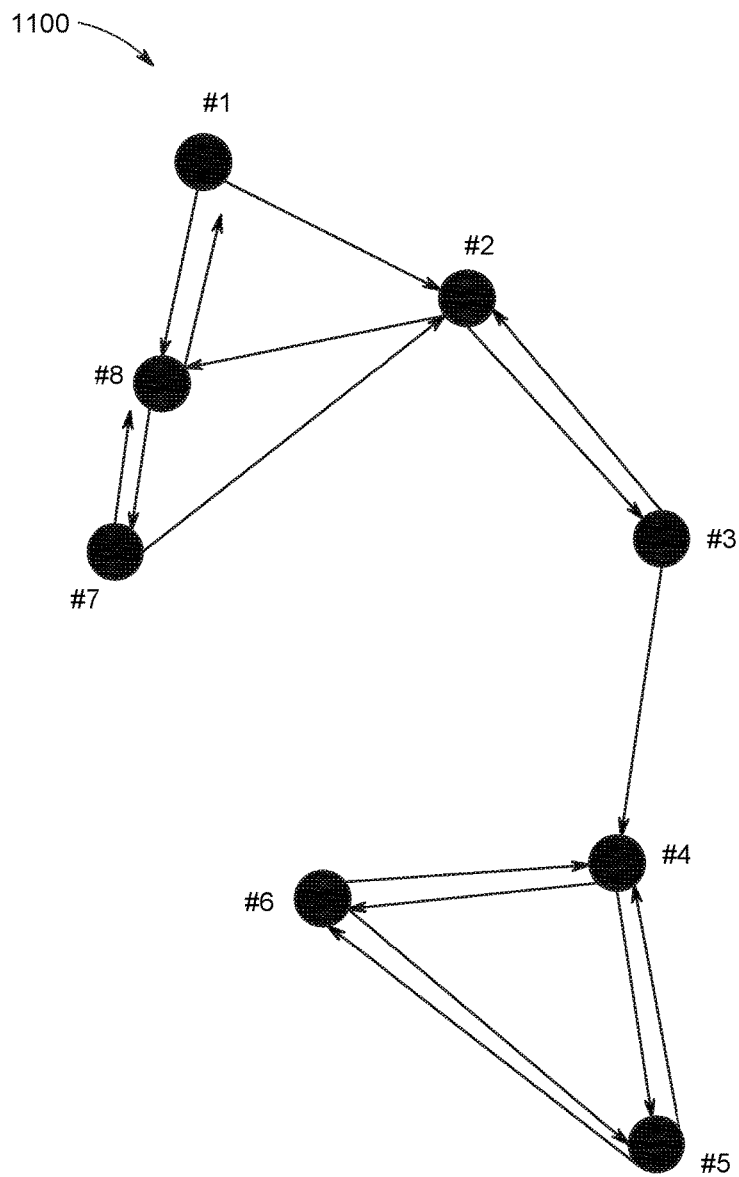
FIG. 11 is an illustrative depiction of a lighting fixture installation, in accordance with some embodiments herein.

FIG. 11 is a depiction of an example installation 1100 of eight (8) lighting fixtures, where each lamp's identifier or ID is shown next to its respective lighting fixture.

FIG. 12 is a tabular listing 1200 of the calculated distance 1210 between the lighting fixture 1205 having an ID of "6" and each of the other lighting fixtures listed in column 1215. As expected, the distance between lamp 6 and itself is shown to be zero.

FIG. 13 is an ordered listing of the data of FIG. 12 where the data is sorted or organized based on distance from the subject lighting fixture "6". As shown, the lighting fixtures are listing in ascending order from the lamp closest to lamp "6" to the lamp located the farthest away from lamp "6".

Based on an ordered listing as shown in the example of FIG. 13, the first and second closet lighting fixtures to a particular lighting fixture may be interpreted to comprise the first neighborhood for the particular lamp. Based on similar determinations of first neighbors for each lighting fixture in a subject installation, a neighborhood matrix 1400 as shown in FIG. 14 can be calculated. FIG. 14 is an illustrative representation of a neighborhood matrix in accordance with some embodiments herein. Referring to FIG. 14, it is seen that the closest neighboring lighting fixtures to lamp "6" are lamps "4" and "5", as indicated by the value of 1 at the corresponding positions in matrix 14. Matrix 1400 is a directed graph. FIG. 15 is an illustrative depiction of a directed graph corresponding to matrix 1400 where the neighbors are determined from both sides at each lighting fixture.

Figures 16, 17:
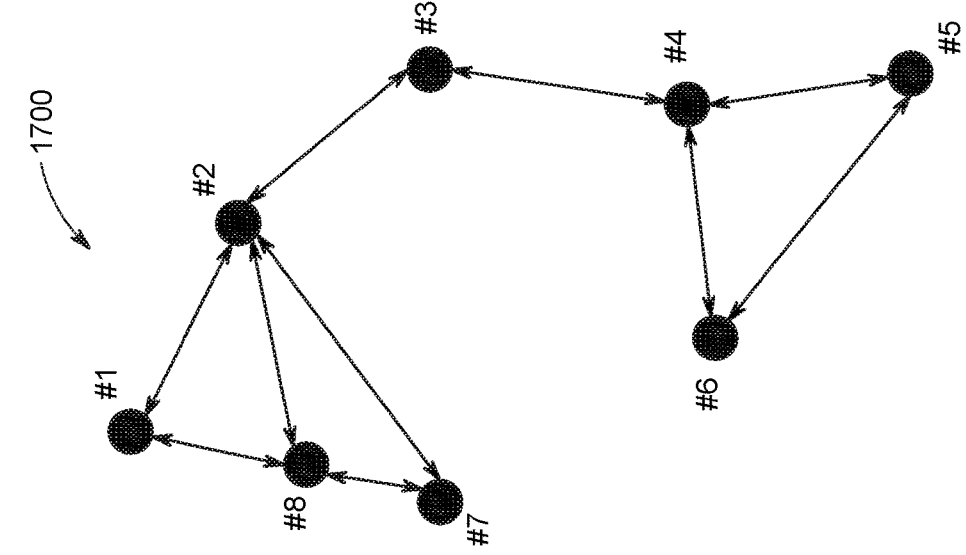
FIG. 16 is an illustrative depiction of an example matrix for a process, in accordance with some aspects and embodiments herein.
FIG. 17 is an illustrative depiction of a lighting fixture installation, in accordance with some aspects and embodiments herein.

FIG. 16 is an illustrative depiction of a neighborhood matrix 1600 for an undirected graph 1700 of FIG. 17 corresponding to matrix 1600.

Figure 19:
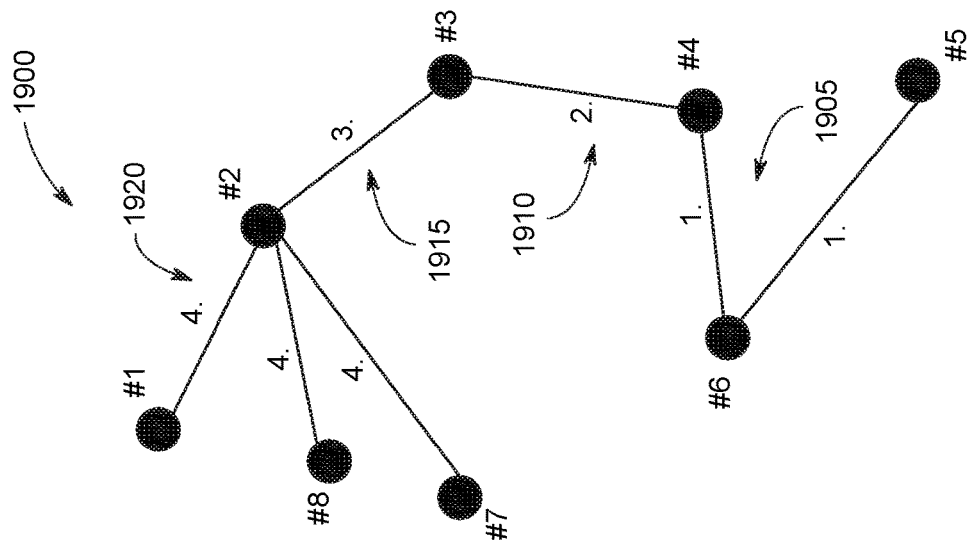
FIG. 19 is an illustrative depiction of a lighting fixture installation corresponding to FIG. 18, in accordance with some aspects and embodiments herein.
Figure 18:
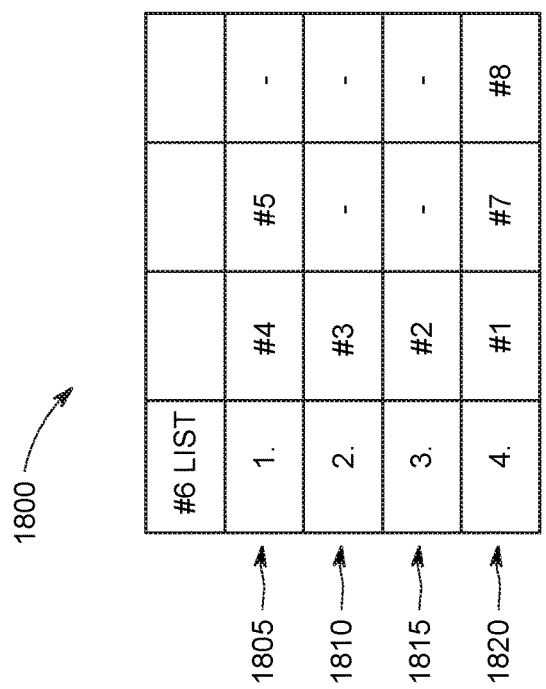
FIG. 18 is an illustrative tabular listing of data for a process, in accordance with some embodiments herein.

In some embodiments, second and third neighbors for a lighting fixture may be determined and calculated. FIG. 18 is a tabular listing 1800 that shows first neighbors in row 1805, a second neighbor in row 1810, a third neighbor in row 1815, and fourth neighbors in row 1820. In some embodiments, lamps in a same neighborhood may be illuminated and dimmed in concert with each other due to their closeness to each other. FIG. 19 is an illustrative graph showing the first neighborhood 1 (1905), second neighborhood 2 (1910), third neighborhood 3 (1915), and fourth neighborhood 4 (1920). In some embodiments, neighborhoods or groupings of lighting fixtures may be determined or established based on a distance. For example, a first neighborhood may comprise lighting fixtures less than 5 meters of each other, a second neighborhood may encompass lamps between 5 and less than 10 meters of each other, a third neighborhood may include lighting fixtures between 10 meters and 12 meters of each other, etc.

In some embodiments, a lighting system herein may comprise lighting fixtures that include both motion sensors and GPS devices, such as the lighting fixture depicted in FIG. 1. Additionally, some embodiments herein include processes that may determine use both motion data and GPS/location data from the lighting fixtures to accurately determine neighboring lighting fixtures, a topology, and other aspects regarding the lighting system. A combination or hybrid system that leverages the data from lighting fixtures having both motion sensors and GPS devices may provide improved accuracies in different situations. For example, in an environment where lighting fixtures are located near an entrance to a facility and an exit of the facility there may be a lot of traffic moving near both the entrance and the exit at the same time. In a system relying only on motion data, one conclusion may be that the lighting fixtures located near the entrance and the exit to the facility are closely correlated and should therefore be operated similarly at the same time. Yet, based on the distance between the two lighting fixtures, the lighting fixtures should not, as a practical matter, be operated the same. However, by further considering the distance between the entrance and exit lighting fixtures using GPS/location data from the lamps, a determination may be made that the entrance lighting fixture should not be operated similarly even though there is a high correlation between their motion data because these lamps are not neighbors.

In another example highlighting some of the benefits of a combination or hybrid lighting system that leverages data from lighting fixtures having both motion sensors and GPS devices, a first and second lighting fixture may be located close to each other but on different parallel roadways. In this environment, the lamps are closely located to each other, that is neighboring lamps as determined by the distance therebetween. However, a car or other entity travelling on the first roadway where the first lamp is located will not simultaneously cause a motion in the vicinity of the second lamp on the second roadway that is parallel to the first roadway. Using aspects of a motion data based process for determining correlated lighting fixtures as disclosed herein, the combination system may accurately determine that although the first and second lighting fixtures are located closest to each other, they should not be considered neighbors since they are not subjected to the same motion at the same time(s).

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Figure 20:
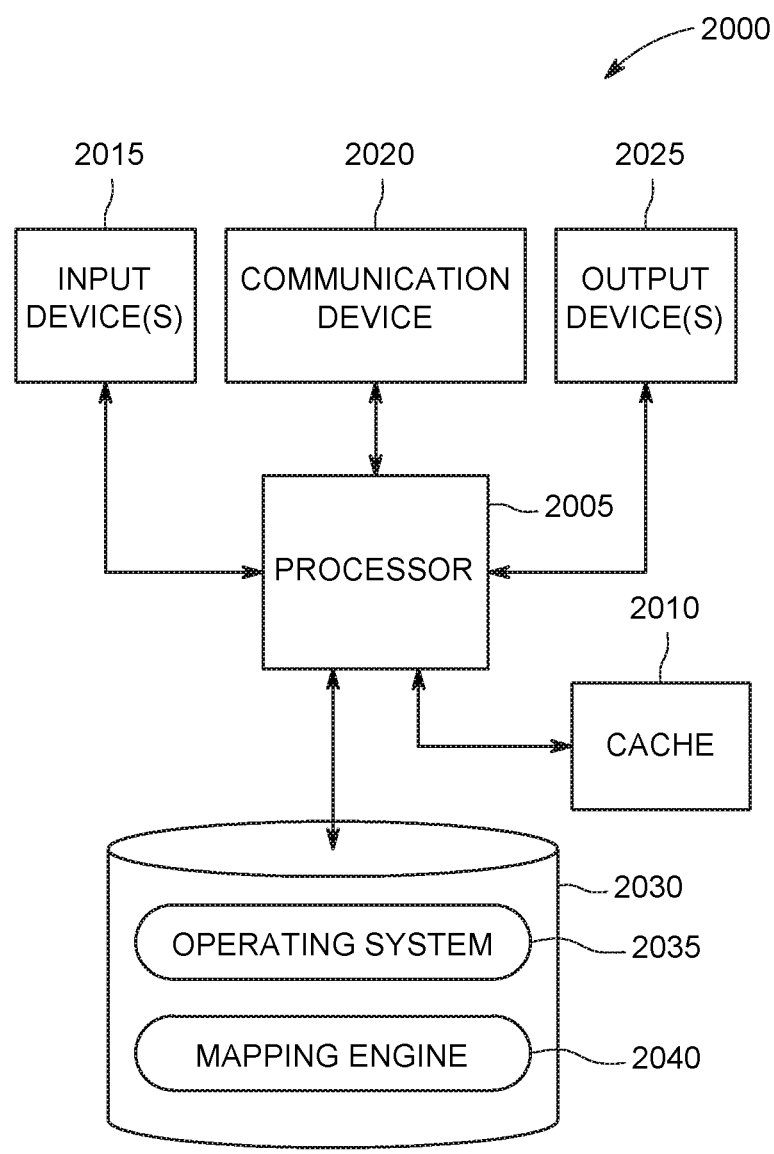
FIG. 20 is an illustrative a schematic block diagram of a processor-enabled device, in accordance with some aspects and embodiments herein.

FIG. 20 is an illustrative depiction of a system, apparatus, or device that may be used to, for example, implement one or more of the logical descriptions of abstractions of FIGS. 2 and 10. FIG. 20 is a block diagram of a computing device or machine, in accordance with some embodiments. In some embodiments, system 2000 may be an embedded system or a microcontroller. System 2000 may be, for example, associated with devices for implementing the processes disclosed herein, including the disclosed indoor positioning system process(es). System 2000 comprises a processor 2005, such as one or more commercially available Central Processing Units (CPUs) in the form of one-chip microprocessors or a multi-core processor, coupled to a communication device 2020 (e.g., a wireless transceiver) configured to communicate with other luminaire units in an installation to execute some of the processes herein via a communication network (not shown in FIG. 20). System 2000 may also include a cache 2010, such as RAM memory modules. The system may further include an input device 2015 (e.g., a motion sensor, a GPS device, a touchscreen, mouse and/or keyboard to enter content) and an output device 2025 (e.g., a touchscreen, a computer monitor to display, a LCD display). In some embodiments, system 2000 may perform at least some of the functions associated with one or more of the logical descriptions and abstractions of FIGS. 2 and 13.

Processor 2005 communicates with a storage device 2030. Storage device 2030 may comprise any appropriate information storage device, including combinations of magnetic storage devices (e.g., a hard disk drive), optical storage devices, solid state drives, and/or semiconductor memory devices. In some embodiments, storage device 2030 may comprise a database system, including in some configurations an in-memory database.

Storage device 2030 may store program code or instructions to control an operation of a computing device (e.g., system 2000) to perform light fixture location determinations, in accordance with processes herein. Processor 2005 may perform the instructions for implementing, for example, process 200 and 1000 in accordance with any of the embodiments described herein. Program instructions for determining a correlation between lighting fixtures based on motion data and determining neighboring lighting fixtures based on a distance may be executed by a mapping engine 2040 may be provided, as well as other program elements, such as an operating system 2035. Storage device 2030 may also include data used by system 2000, in some aspects, in performing one or more of the processes herein, including individual processes, individual operations of those processes, and combinations of the individual processes and the individual process operations.

Although embodiments have been described with respect to certain contexts, some embodiments may be associated with other types of devices, systems, and configurations, either in part or whole, without any loss of generality. For example, in some embodiments, a yagi antenna may be used to radiate signals parallel to the antenna. In some such embodiments, the antenna may be housed in separate module where the module is positioned to take advantage of the radiation pattern of the yagi antenna.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method for installing and setting up a lighting system, the method comprising:
    installing a plurality of lighting fixtures, each of the lighting fixtures being installed at a location where they are to be operated and comprising:
        a housing;
        a light source including at least one source of illumination disposed in the housing; and
        a motion sensor disposed in or on the housing to sense a motion in a vicinity of the lighting fixture and to generate a signal in response to a detected motion by the motion sensor, the signal including an identifier of the lighting fixture;
    receiving a signal, within at least one processor-enabled computing device, from the plurality of lighting fixtures detecting motion in the vicinity thereof;
    storing a dataset, within the at least one processor-enabled computing device, including data representing the signals from the plurality of lighting fixtures;
    determining a correlation, within the at least one processor-enabled computing device, between the plurality of lighting fixtures detecting a motion at a same time based on the received signals from the plurality of lighting fixtures, as represented in the dataset;
    determining a topology of the installed lighting fixtures, within the at least one processor-enabled computing device, based on the determined correlation between the plurality of lighting fixtures;
    determining a grouping of the installed lighting fixtures, within the at least one processor-enabled computing device, based on the determined topology of the installed light fixtures; and
    sending a communication from the at least one processor-enabled computing device to enable each light fixture within the determined grouping of the installed lighting fixtures to operate in a similar manner.

2. The method of claim 1, wherein the correlation represents a likelihood that a first lighting fixture and a second lighting fixture will detect the same motion from their respective installed location.

3. The method of claim 1, wherein the correlation is expressed in as a probability coefficient.

4. The method of claim 1, further comprising determining at least one of a commissioning and a lighting control scheme based on the determined topology of the installed lighting fixtures.

5. The method of claim 4, wherein the lighting control scheme is automatically and adaptively determined.

6. The method of claim 1, wherein the correlation is determined automatically in reply to at least a change to: the number of lighting fixtures included in the plurality of lighting fixtures, an operation of one or more of the plurality of lighting fixtures, a traffic density in the vicinity of the lighting fixtures, seasons, and ambient light in the vicinity of the lighting fixtures.

7. The method of claim 1, wherein at least one signal indicative of each lighting fixture detecting motion is received and the dataset stores data representing the signals from each of the plurality of lighting fixtures.

8. The method of claim 1, wherein the at least one processor-enabled computing device sends a communication to each light fixture within the determined grouping of the installed lighting fixtures to operate in a similar manner at the same time.

9. A method for installing and setting up a lighting system, the method comprising:
    installing a plurality of lighting fixtures, each of the lighting fixtures being installed at a location where they are to be operated and comprising:
        a housing;
        a light source including at least one source of illumination disposed in the housing; and
        a global positioning system (GPS) device disposed in or on the housing to transmit positioning data indicative of a location of the lighting fixture;
    receiving a signal, within at least one processor-enabled computing device, from the plurality of lighting fixtures, the signal including the positioning data indicative of the location of each respective lighting fixture;
    storing a dataset, within the at least one processor-enabled computing device, including data representing the location of the plurality of lighting fixtures;
    determining neighboring lighting fixtures, within the at least one processor-enabled computing device, for the plurality of lighting fixtures based on a distance calculation based on the location of the plurality of lighting fixtures, as represented in the dataset;
    determining a topology of the installed lighting fixtures, within the at least one processor-enabled computing device, based on the determined distances between the plurality of lighting fixtures;
    grouping neighboring lighting fixtures into one or more neighborhoods within the at least one processor-enabled computing device; and
    sending a communication from the at least one processor-enabled computing device to enable each light fixture grouped within the one or more neighborhoods to operate in a similar manner.

10. The method of claim 9, wherein at least one signal indicative of the location of each respective lighting fixture motion is received prior to a determining of the neighboring lighting fixtures.

11. The method of claim 9 further comprising determining at least one of a commissioning and a lighting control scheme based on the determined topology of the installed lighting fixtures.

12. The method of claim 11, wherein the lighting control scheme is automatically and adaptively determined.

13. The method of claim 9, wherein the positioning data indicative of the location of each respective lighting fixture is expressed as values in a geographic coordinate system.

14. The method of claim 9, wherein the at least one processor-enabled computing device comprises a centralized or de-centralized configured system.

15. The method of claim 9, wherein the neighboring lighting fixtures for the plurality of lighting fixtures is determined automatically in reply to at least a change to: a number of lighting fixtures included in the plurality of lighting fixtures, an operation of one or more of the plurality of lighting fixtures, a traffic density in the vicinity of the lighting fixtures, a time of year, and ambient light in the vicinity of the lighting fixtures.

16. A method for installing and setting up a lighting system, the method comprising:
    installing a plurality of lighting fixtures, each of the lighting fixtures being installed at a location where they are to be operated and comprising:
        a housing;
        a light source including at least one source of illumination disposed in the housing;
        a motion sensor disposed in or on the housing to sense a motion in a vicinity of the lighting fixture and to generate a signal in response to a detected motion by the motion sensor, the signal including an identifier of the lighting fixture;
        a global positioning system (GPS) device disposed in or on the housing to transmit positioning data indicative of a location of the lighting fixture;
    receiving a signal, within at least one processor-enabled computing device, from the plurality of lighting fixtures detecting motion in the vicinity thereof;
    receiving a signal, within the at least one processor-enabled computing device, from the plurality of lighting fixtures, the signal including the positioning data indicative of the location of each respective lighting fixture;
    storing a dataset, within the at least one processor-enabled computing device, including data representing the signals from the plurality of lighting fixtures detecting motion in the vicinity thereof and data representing the location of the plurality of lighting fixtures;
    determining a correlation, within the at least one processor-enabled computing device, between the plurality of lighting fixtures detecting a motion at a same time based on the received signals from the plurality of lighting fixtures, as represented in the dataset;
    determining neighboring lighting fixtures, within the at least one processor-enabled computing device, for the plurality of lighting fixtures based on a distance calculation based on the location of the plurality of lighting fixtures, as represented in the dataset; and
    determining a topology of the installed lighting fixtures, within the at least one processor-enabled computing device, based on the determined correlation between the plurality of lighting fixtures;
    determining a grouping, within the at least one processor-enabled computing device, based on the determined topology of the installed light fixtures; and
    sending a communication from the at least one processor-enabled computing device to enable each light fixture within the determined grouping of the installed lighting fixtures to operate in a similar manner.

17. The method of claim 16, wherein the correlation represents a likelihood that a first lighting fixture and a second lighting fixture will detect the same motion from their respective installed location.

18. The method of claim 16, further comprising determining at least one of a commissioning and a lighting control scheme based on the determined topology of the installed lighting fixtures.

19. The method of claim 18, wherein the lighting control scheme is automatically and adaptively determined.

20. The method of claim 18, wherein at least one signal indicative of each lighting fixture is received and the dataset stores data representing the signals from each of the plurality of lighting fixtures.

* * * * *